(12) United States Patent
Kosanovic et al.

(10) Patent No.: US 7,502,337 B2
(45) Date of Patent: Mar. 10, 2009

(54) INTELLIGENT VOICE NETWORK MONITORING USING ECHO CANCELLATION STATISTICS

(75) Inventors: Bogdan Kosanovic, Bethesda, MD (US); Frank Fruth, Gaithersburg, MD (US)

(73) Assignee: Texas Instruments Incorporated, Dallas, TX (US)

( * ) Notice: Subject to any disclaimer, the term of this patent is extended or adjusted under 35 U.S.C. 154(b) by 657 days.

(21) Appl. No.: 11/096,866

(22) Filed: Apr. 1, 2005

(65) Prior Publication Data
US 2006/0221876 A1    Oct. 5, 2006

(51) Int. Cl.
*H04B 3/20* (2006.01)
*H04L 12/56* (2006.01)
(52) U.S. Cl. ...................................... 370/286; 370/352
(58) Field of Classification Search ......... 370/286–291, 370/401, 508, 449, 352–356, 400; 706/52; 455/422.1; 379/88.17
See application file for complete search history.

(56) References Cited
U.S. PATENT DOCUMENTS

| 5,473,596 | A | 12/1995 | Garafola et al. |
| 5,655,081 | A | 8/1997 | Bonnell et al. |
| 5,687,290 | A * | 11/1997 | Lewis .......................... 706/45 |
| 6,072,857 | A | 6/2000 | Venkateshwaran et al. |
| 6,457,015 | B1 | 9/2002 | Eastham |
| 6,502,132 | B1 | 12/2002 | Kumano et al. |
| 2004/0170164 | A1 * | 9/2004 | LeBlanc et al. ............. 370/389 |
| 2005/0021212 | A1 * | 1/2005 | Gayme et al. ................. 701/99 |
| 2006/0098670 | A1 * | 5/2006 | Voit et al. .................... 370/401 |
| 2006/0153174 | A1 | 7/2006 | Towns-von Stauber et al |
| 2006/0221942 | A1 * | 10/2006 | Fruth et al. ................. 370/356 |

* cited by examiner

*Primary Examiner*—John Pezzlo
(74) *Attorney, Agent, or Firm*—Steven A. Shaw; W. James Brady; Frederick J. Telecky, Jr.

(57) ABSTRACT

Monitoring voice quality passively using line echo cancellation data across a telecommunications network and reporting monitoring data to a central network management system. Network is monitored for potential voice quality issues for pro-active isolation of problems prior to customer complaints about the problems. Line echo cancellation related and non-related data for IP and other networks is gathered and correlated together to provide voice quality assessments of network performance.

9 Claims, 5 Drawing Sheets

INTELLIGENT VOICE NETWORK MONITORING USING ECHO CANCELLATION STATISTICS

CROSS-REFERENCE TO RELATED APPLICATIONS

None

FIELD OF THE INVENTION

The present invention relates generally to monitoring of voice quality and network conditions in a telecommunications network. More specifically, the invention provides voice quality monitoring in a voice over Internet Protocol (VOIP) network.

BACKGROUND OF THE INVENTION

In typical telecommunications systems, voice calls and data are transmitted by carriers from one network to another network. Networks for transmitting voice calls include packet-switched networks transmitting calls using voice over Internet Protocols (VoIP), circuit-switched networks like the public switched telephone network (PSTN), asynchronous transfer mode (ATM) networks, etc. Recently, voice over packet (VOP) networks are becoming more widely deployed. Many incumbent local exchange and long-distance service providers use VoIP technology in the backhaul of their networks without the end user being aware that VoIP is involved.

Traditional service providers use techniques to manage service quality developed over the last 100 or more years for circuit-switched networks. Methods include tracking of customer and network trouble reports and re-design of voice networks. Service providers use well-understood rules to characterize service level in terms of voice quality (e.g., based on loss, delay, and echo), and in difficultly in establishing a call. Then, a service provider's main tool to assess service quality while the network is in operation is based on trouble reports from users, as well as general network equipment failure notification.

Voice quality is traditionally thought of as the end user's perception of quality. Network performance will affect voice quality. However, as VoIP technology increases in demand on a network and networks become more complicated with connections through the Internet and PSTN using IP phones (wired and wireless) and residential voice gateways, VoIP providers have a much more difficult time assuring the voice quality for their subscribers. Reasons for this include lack of control over the underlying transport network, such as when a service provider providing voice service from a residential gateway attaches to another provider's residential broadband cable modem or DSL (Digital Subscriber Line) service and the use of transport technology that can vary in quality. For example, using WLAN (wireless local area network) media to transport VoIP, especially when the wireless end user is moving between WLANs.

An example of networks and components for a VoIP call is illustrated in FIG. 1. Access network 10 could be any network accessing the Internet such as an IP, Asynchronous Transfer Mode (ATM), or Ethernet network, which is a managed broadband network. Network 10 comprises a router 14 connected to various customer premise equipment and to media gateway 12. Media gateway 12 must be capable of detecting changing resource or network conditions. The ability to detect and monitor changing resource and network conditions can result in significant cost reductions and/or improved quality. Router 14 is connected to Internet Access Device (IAD) 16, wireless access point (AP) 22, and/or IP PBX (personal branch exchange) 32. A voice call may be placed between any of the customer equipment phones 18 connected to IAD 16, wireless IP phone 24 connected to AP 22, or IP PBX phone 30. Using special software, calls could also be placed through computer 20 connected to IAD 16 or portable computer 26 connected to AP 22.

Customer equipment is connected through access broadband network 10 to the Internet 34 by media gateway 12. On the far end is the PSTN 48, networking to POTS phone 52 through a Central Office 50. PSTN is also connected to the Internet 34 through a trunk gateway, composed of signal gateway 44, media gateway controller/proxy (MGC) 42, and trunk media gateway (MG) 46. IP and packet data (e.g., real time protocol (RTP packet data)) associated with the call is routed between IAD 16 and trunk MG 46. The trunk gateway system provides real-time two-way communications interfaces between the IP network (e.g., the Internet) and the PSTN 50. As another example, a VoIP call could be initiated between WIPP 24 and WIPP 40 connected to AP 38. In this call, voice signals and associated packet data are sent between MG 12 and MG 52 through Internet 42, thereby bypassing the PSTN 48 altogether.

Factors that affect voice quality in a VoIP network are fairly well understood. The level of control over these factors will vary from network to network. This is highlighted by the differences between a well-managed small network enterprise verses an unmanaged network such as the Internet. Network operational issues affect network performance and will create conditions that affect voice quality. These issues include outages/failures of network switches, routers, and bridges; outages/failure of VoIP elements such as call servers and gateways; and traffic management during peak periods and virus/denial of service attacks.

Software for VoIP systems is a critical ingredient of high-quality VoIP systems. There are many features that must be implemented for carrier-class systems. The most important software features include echo cancellation, voice compression, packet play-out software, tone processing, fax and modem support, packetization, signaling support, and network management. New networking technologies and deployment models are also causing additional challenges that affect the ability of VoIP service providers to guarantee the highest levels of service quality (e.g., toll quality) in their deployments. Two such examples are where the VoIP service provider does not control the underlying packet transport network, and the use of packet networks with potentially high delay and loss, such as in 802.11 WLAN (Wireless Local Area Network) technology.

The ability to detect and report on events in a network that adversely affect voice quality is critical for managing a voice network. The oldest network voice quality tool is the listening opinion tests, where human listeners rate call quality in a controlled setting (from ITU-T Spec. P.800). Overall results are compiled to produce a mean opinion score (MOS), which is based on a panel of listeners ranking the quality of a series of call samples on a scale of 1 (Bad) to 5 (Excellent). An aggregate score of 4 or more is considered toll quality, which is the standard for the PSTN. While this test has the disadvantage of being subjective, expensive, and time-consuming to produce, it is traditionally recognized as the most consistent measure of voice quality available.

Most of the subsequent voice quality measurement tools have involved algorithms and tools that can objectively measure voice quality. These are based on mathematical calculations on sound samples, rather than listening tests. In general, such tests can be roughly classified as active (or intrusive) and passive (or non-intrusive). Active tests perform calculations on test or simulated calls and thus intrude on normal network usage, while passive tests can perform calculations on active calls in live networks without any interruption of service It is costly to test the quality of voice networks at the component and system level and to measure the performance of active networks, since revenue-producing traffic must be interrupted to perform the tests. Further, while testing algorithms can quantify deficiencies in speech quality, they do not produce information to help localize and identify the root causes of the situations causing the deficiency. Passive tests run in live networks without interrupting active calls and often use statistics gathered on active calls. The testing modules are actually embedded into the VoIP equipment at the use site and in the VoIP service provider's network.

In current VOP deployments, voice quality issues are first typically discovered and reported by customers which triggers an investigation and debugging by service providers. This method of problem detection can lead to longer problem resolution times and increase customer dissatisfaction. Currently, there exits no system and method that provides an enhanced means for service providers to effectively monitor their networks for potential voice quality issues and proactively isolate problems before customer complaints are received.

SUMMARY

The limitations of the prior art are overcome by the present invention's technique for intelligent real-time monitoring of voice network conditions. At all levels of a voice data network, selected voice quality related data or MOS scores can be compared to and analyzed against a set of thresholds and/or rules for each particular type of data. Based on a raw or aggregated sets of voice quality data and MOS scores at each network element, a voice quality assessment is determined.

Data collection of voice quality assessments of any network element or group of elements can be searched in real-time to analyze for errors on a macro scope for an entire network, intermediate network levels, or for individual analysis on a micro level. Thus, the quality of the VOIP network can be monitored and instantly determined at any time using diagnostics within each level of the network that report voice quality assessments. An overall voice quality assessment score may represent any organization of individual data assessments, entire call paths of the network, or for each network element such as a module, node, gateway, IPP, server, etc.

In an alternative embodiment, voice quality related data is gathered and submitted for fuzzification using fuzzy logic. The method assigns fuzzy data sets to each component of a network that affects voice quality and network operations. The fuzzy sets are measured and reported against a set of rules and thresholds to determine behaviors. Fuzzy data sets from any set of network components across any network level may be combined and analyzed. A combination of organized fuzzy data sets across parts of the network or an entire network can result in a single fuzzy reporting values that reflect network and call quality for the entire network.

BRIEF DESCRIPTION OF THE DRAWINGS

Preferred embodiments of the invention are discussed hereinafter in reference to the drawings, in which.

DETAILED DESCRIPTION OF PREFERRED EMBODIMENTS

Figure 1:
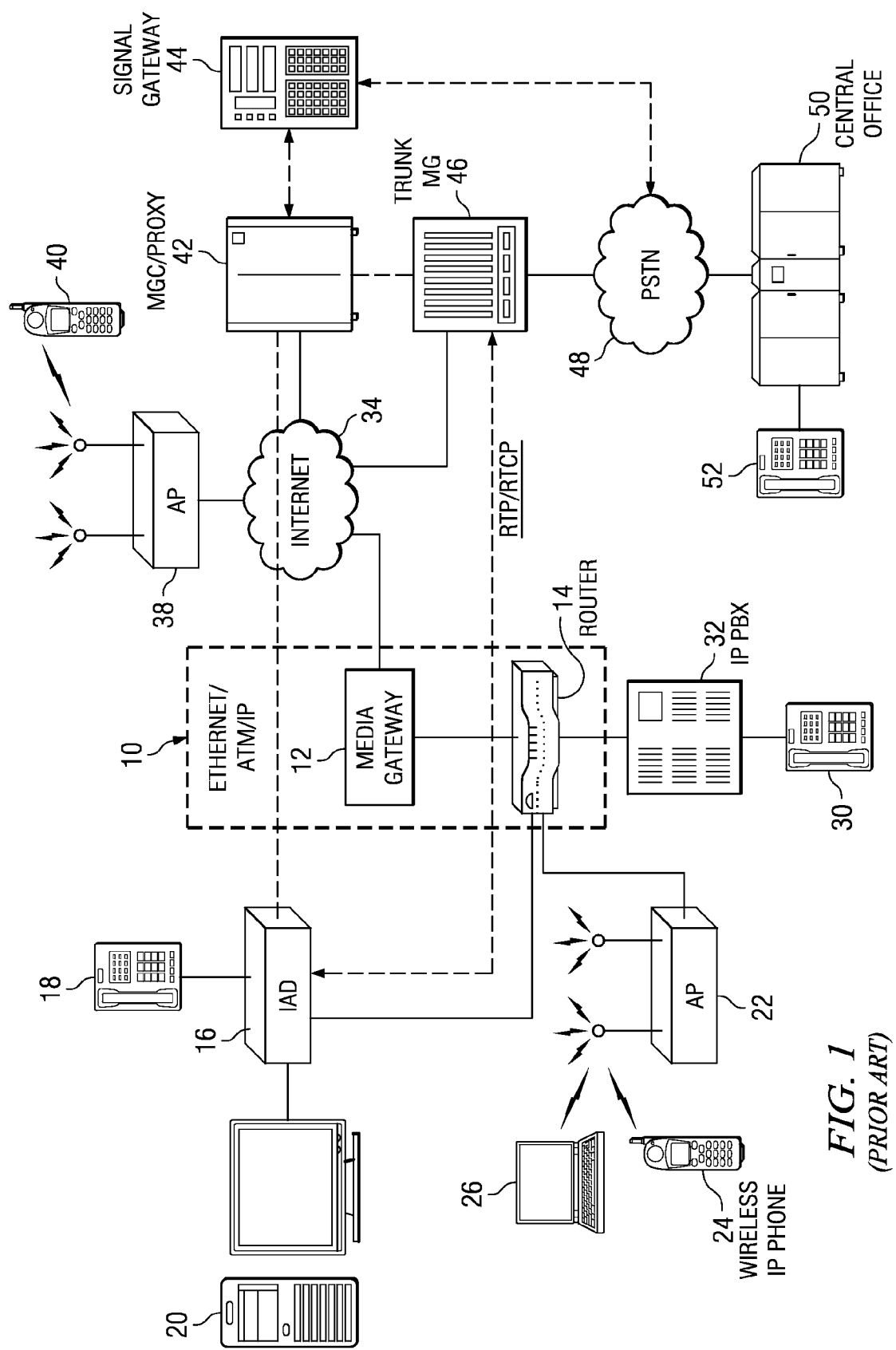
FIG. 1 illustrates a diagram of call placed over a voice-data network.
Figure 2:
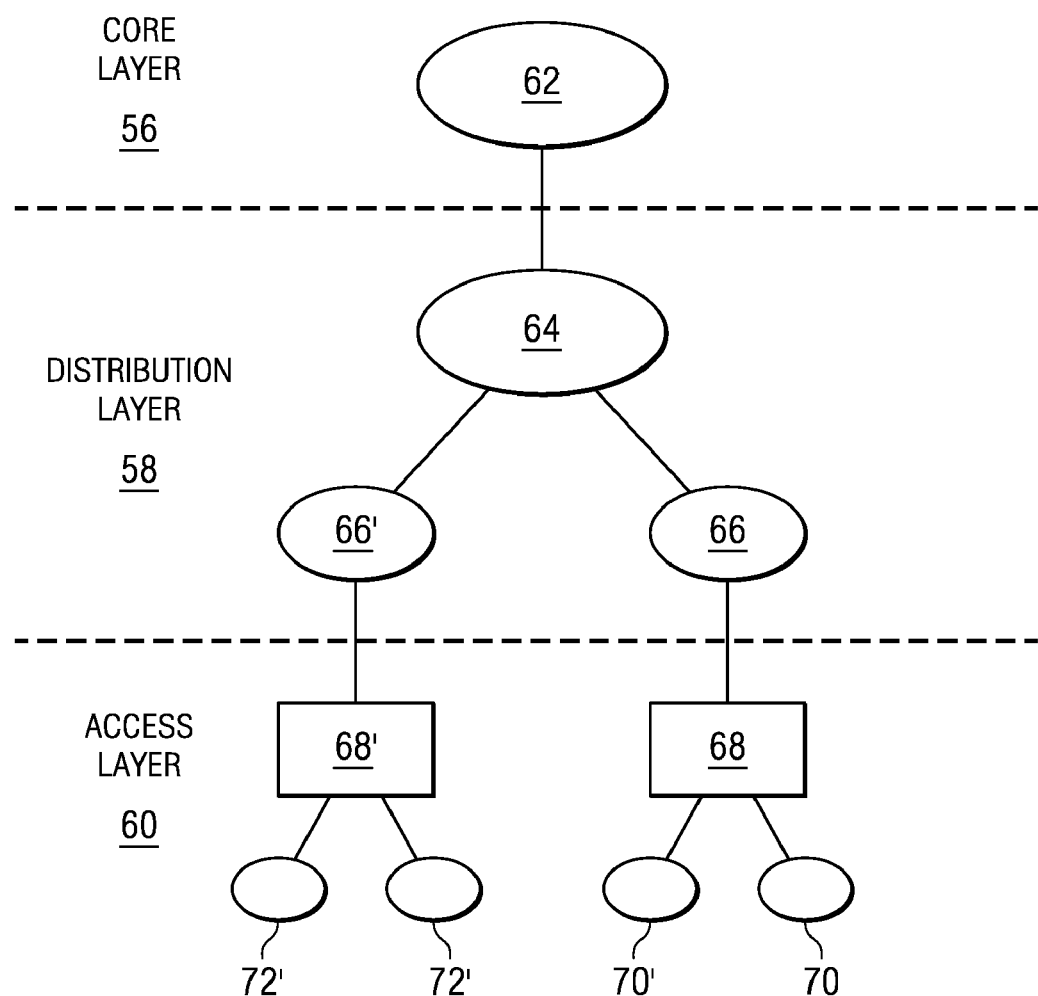
FIG. 2 illustrates a general diagram of a telecom network.

The preferred embodiment of the present invention includes a system and technique for intelligent monitoring of network conditions for a telecommunications data network, such as a voice over Internet Protocol (VOIP) network using line echo cancellation data and statistics. To demonstrate the preferred embodiment of the present invention, a general network diagram is illustrated in FIG. 2. The network diagram depicts a telecom network divided into hierarchical levels of core 56, distribution 58, and access 60 layers. It is understood that the hierarchical divisions are merely for exemplary purposes and are not meant to limit the aspects of the present invention. The highest level of hierarchy is the core layer 56. Core layer 56 generally comprises a high-speed switching backbone 62 and may have data lines connected to one or more external telecom or switched networks, such as another commercial carrier, the Public Switched Telephone Network (PSTN), or the Internet. The second level of hierarchy is the distribution layer 58, which connects core layer 56 to lower-level Access Layer 60. Distribution layer 58 generally contains one or more local area networks (LANs) 64 connecting communication servers, routers, and media gateways (MG's) 66, 66'. Network devices on distribution layer 58 provide access for user-level network nodes 68, 68' in access layer 60 to large networks in the core layer 56.

Access layer 60 contains network nodes 68, 68' that are generally more application-specific or user-specific elements of the network. Examples of nodes include personal computers, residential gateways, and individual IP phones. The basic entity in a network is the module 70, 70' and 72, 72'. A node 68 will comprise one or more modules 70. Modules 70 are basic units of software and/or hardware components that comprise the node 68. Processors, software components running specific algorithms, and communications channels in a processor are all examples of modules. Network elements are also classified in a relative fashion, where an element may be classified as a node but may exist on a non-access level defined area of a network.

Figure 3:
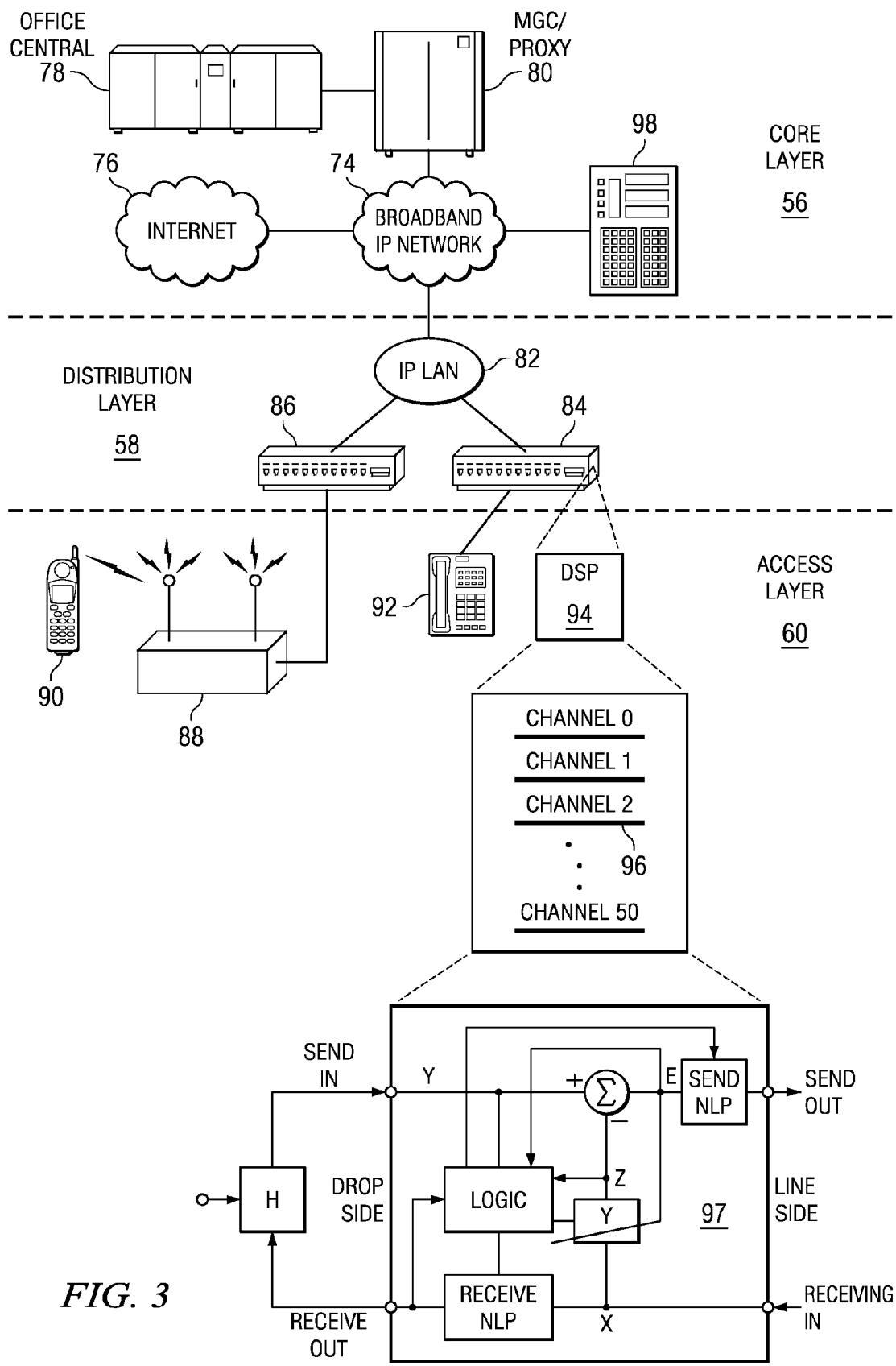
FIG. 3 illustrates a network diagram of a voice-data network.

Referring to FIG. 3, an exemplary voice over Internet Protocol (VOIP) network is illustrated. Core layer 56 may comprise a broadband VOIP network 74 connected to both Internet 76 and PSTN 78 via media gateway 80. Access layer 58 comprises hardware and software that allows user-level clients in the network to communicate with core layer networks. Although FIG. 3 shows LAN 82 connecting media gateway 84 and communication server 86 to broadband network 82, alternative lines of network access are possible that connect MG 84 directly to PSTN 78 and communication server 86 directly to Internet 76. Communication server 86 provides control that allows call establishment over all of the IP network for client endpoints in the Access Layer 60. It is also used to coordinate the address translations and handle call signal processing, call setup, call management, resource management, and call admission control in the IP network.

Active call states and data logging are usually functions of the communication server 86 as well.

Media gateway 80 is a trunk-side MG that functions to transfer VOIP packet data between analog or digital client endpoint devices and analog or digital voice trunks. The purpose of a MG is to provide media mapping and transcoding functions between the IP network and circuit-based switches. It may further provide echo cancellation and coding or SIP on the VOIP side and similar functions as necessary on the trunk side. Residential media gateway (RMG) 84 is a client-side MG that serves a similar function as the trunk-side MG 80 but on a much smaller scale, such as a telephone network in a residential home.

Nodes on an IP network can include end-point VOIP network clients such as residential media gateways (RMG's), Internet Protocol Phones (IPPs), wireless IPPs or their components such as DSPs, voice channels, codecs running on the DSPs, and individual algorithms used by a codec are all types of nodes. In the example, node 88 is a wireless access point (AP) for a local WLAN that is used to transmit data between IPP 90 and communication server 86. IP phone 92 is connected to MG 84, which can place calls through broadband network 74 or in the alternative directly to PSTN 78. MG 84 has further software and hardware nodes such as an internal DSP 94 that comprises a number of voice-data channels 96. In each channel, different modules of software run voice-related algorithms that can include echo cancellation, packet loss concealment, and voice codecs.

Figure 4:
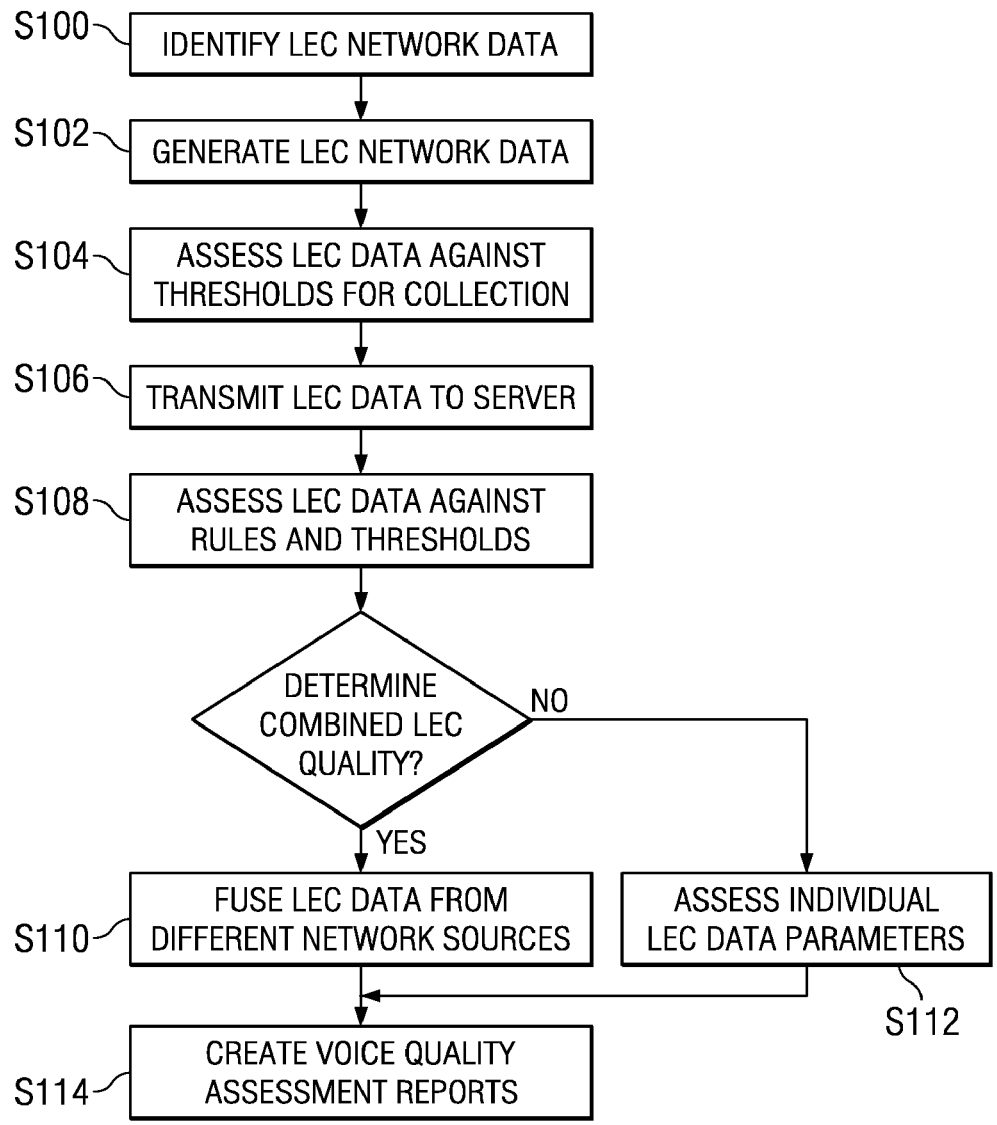
FIG. 4 contains a flowchart of the method of the preferred embodiment for an intelligent voice network monitoring system.

Referring to FIG. 4, the method of the preferred embodiment uses a network administrator to determine the identities of echo cancellation and echo cancellation-related data (LEC data) S100 and generate this data for each appropriate hardware and software element at each network level S102. Network elements on each hierarchical level of the network platforms perform monitoring of their own or operatively connected systems to generate voice quality data sets. The collection process can depend on operational parameters or an exhibition of certain behaviors, such as exceedance of a threshold S104. There is an operational determination made of the status of hardware, software, and communication links for each aspect of the network from the highest levels down to modules in each node.

To accomplish LEC data reporting, each network element at each network level may calculate and generate data for direct reporting or for aggregation with related data groups to create a more comprehensive voice quality assessment of the network element and its related elements. LEC data is reduced in volume using operational rules, thresholds, and notifications of voice processes in order to measure "Health" metrics of the VOIP network. Data may be generated and reported continually or periodically according to configuration by the network administrator. A network administrator also collects LEC data S106 at a central monitoring server 98 that can be connected anywhere within the network.

If raw data is not requested nor needed from a network component, then in the alternative only a LEC data quality report summarizing the LEC data of the module, node, or any monitored element can be generated. Data capture is provided using diagnostic functions of the element or external software. Monitored elements and transmission streams include bidirectional time division multiplex (TDM) stream capture, echo cancellation stream capture, packet stream capture, DSP communication stream capture, statistics reporting, and remote control of diagnostic features such as tracings, loopbacks, signal generation, and statistical queries, among others. A network administrator also has remote control of diagnostic features that are useful for voice quality monitoring, such as call trace routes to identify network call paths and phone numbers, and real-time indication of network issues flagged by the data reporting and statistical queries.

As stated above, in the preferred embodiment echo cancellation and related data (LEC data) from a VOIP network is generated using line echo canceller (LEC) statistics. Referring to FIG. 3, LEC data is generated S102 from network elements containing LEC software. An exemplary illustration is MG 84 that comprises one or more DSPs 94 containing line echo canceller (LEC) modules in channels 96 that are represented by LEC diagram 97. Echo cancellers statistics report problems in a voice network that result in extreme noise in the send direction, echo path changes (e.g., appearance of multiple reflections), nonlinear distortion, excessive doubletalk, and frame slips.

Echo cancelling status of a voice network is an assessment of combined data for measured LEC statistics. Individual LEC assessments that can be combined together include a network quality status that is evaluated using LEC variables, signal quality status, LEC performance status, and LEC configuration status. This data is generated and collected to a central monitoring server 98 using periodic polling of existing network variables to calculate changes in LEC variables. Some LEC data may be derived from related data, such as using filter coefficients to derive the number and location of hybrid reflections and track their changes over time. Potentially, all LEC variable data that are available at any given time in the VOIP network may be analyzed for network voice quality assessments.

In the preferred embodiment, VOIP LEC data and behavior is assessed against rules and thresholds S108. Data may be monitored along a sliding scale that indicates whether the software or hardware being monitored is trending towards optimum performance or failure. However, the data may also be assigned flags to indicate whether the behavior is over, under or between thresholds given by an administrator. In an exemplary embodiment, such indicators could provide flags, such as "good," "bad," "needs attention" or "red," "yellow," and "green" that may be programmed to reflect the data assessments according to the rules and thresholds.

The quality status of a VOIP network can be evaluated using LEC data generated and analyzed according to the preferred embodiment. LEC-related data that is generated for analysis of network quality includes echo return loss (ERL), frame slips, echo path changes, nonlinear distortion, and hybrid indication. Each generated data variable reflects an indication of the network quality. For example, a high ERL means the LEC is working and the network quality is high. A Low or extremely low ERM indicate problems with the network quality. Further, if a hybrid is detected in the VOIP network, then the identification and location of the hybrid can contribute to assessing and eliminating echo and offsetting other LEC inference rules and thresholds and hence improving voice quality in the network. If hybrids are not detected, a greater potential exists that there are undetected hybrids existing on the network that will cause echo, distort other voice quality indicators to provide false data, and degrade voice quality.

Network quality status can be further assessed by generating and collecting data for echo path changes. Based on the short-term changes of foreground and background filter switch counts in the LEC, "burst" periods may be detected in real time that could indicate a potential echo path change. The echo path change may also be detected by off-line analysis of pulse code modulation (PCM) captures or by analyzing how the LEC filter coefficients change over time. Frame slips (a special case of echo path change) may be detected by analyzing the LEC filter over time.

Nonlinear distortion that affect network voice quality may be confirmed by offline analysis of PCM traces. Data generated from saturated speech levels, combined loss, and an ERL estimate, analyzed individually or combined, could signal a potential for nonlinear distortion. Further, data indicating inability to achieve satisfactory combined loss as well as high speech levels at the far-end as well as very low ERL are all indicators of nonlinear distortion.

The preferred embodiment provides for fusing different voice quality data that affect network quality S110. For example, the network quality status can be assessed by analyzing multiple data sources of predicted residual echo, background noise, nonlinear distortion, double talk, and filter update data. If the LEC had many LMS updates and minimal double talk with a large number of FG switches in a short period of time, then ACOM would be expected to improve and residual echo levels would approach the near-end background noise level. If these indicators are not occurring, then the network status assessment by the preferred embodiment would report a potential for nonlinear distortion. Further, if the LEC's NLP is not active, then a problem may be reported with the associated LEC due to echo leakage due to nonlinear distortion. All of the foregoing network quality status indicators may be assessed together to report and overall network quality status of the VOIP network using only LEC-related data.

In addition to network quality data, individual LEC statistics gathered from nodes, modules, and throughout the PCM data paths on a VOIP network are used to measure and assess signal quality status S112. The call signal quality may be measured using LEC parameters as well as using analysis of PCM traces. Data is generated regarding speech power levels, noise levels, availability of speech signal, and double-talk activity. These different sets of data may be generated from nodes and modules, assessed either individually or in aggregation according to operational and performance rules and thresholds, and then correlated to determine a signal quality status of a local area of the network or the network as a whole, depending on the distribution of collected data.

Although direct speech level measurements are not provided by an LEC, an analysis of PCM traces can be used to determine speech power histograms, which can be used to determine noise and speech power levels. Once speech levels are known, these can be assessed to determine voice quality status. Data from LEC also provides estimates of near-end and far-end background noise levels. This data may also be correlated with the availability of speech signal for LEC updates and double-talk to indicate signal quality status. For example, the LEC reports the number of blocks that were used for BG and search filter updates. A low count for LMS or search updates could indicate either absence of a good signal, increased double-talk, or perhaps a problem with management of MIPS allocated to the LEC to perform these updates. If a combined loss is not adequate and this number is very low, this could be an explanation for the LEC failing to achieving good convergence. If the number is high and increasing and the LEC is still not achieving good combined loss. Further, excessive double-talk may lead to undesirable LEC performance and low voice quality and may often continue undetected due to unbalanced near-end and far-end signal levels. After basic signal conditions are gathered through LEC statistics and sent to central monitoring server 98, a signal quality status can be determined for the VOIP network.

Further LEC data that can be used to assess voice quality of a VOIP network according to the preferred embodiment are data indicating the LEC performance status. LEC performance status measures quality of echo cancellation, such as ACOM, stability based on counters, converged state, suspicious LEC activity based on network status, NLP activity. For example, the measuring the speed of convergence would assume that the timing of the start of a voice call is known, which is often not the case in VoIP applications. However, it is possible to determine the FG and BG switch count rates and potentially determine the periods of increased LMS update activity. This data could be an indication of the time it takes to achieve some type of steady state convergence depth. Convergence depth is also a performance status indicator that is measured by the combined loss.

Non-linear processor (NLP) action is a performance indicator for LEC status. Typically, it is desirable in a voice network that the NLP activity is kept at a minimum. Hence, if the NLP activity is very high there might be potential for talk-over or perhaps only the far-end signal is active most of the time. If the NLP activity is small, there may be a potential for residual echo leakage (e.g. in case of nonlinear distortion or very high far-end levels). The LEC reports the number of segments with active NLP logic and this data can be correlated with the other LEC performance data to indicate an LEC performance status for a channel, or fused with multiple channels, multiple nodes, or data from an entire network to indicate voice quality of the network.

In addition to LEC performance, an LEC configuration status is determine using data generated regarding the LEC tail length, operational conditions, and search status. The configuration status provides indicators that show whether the LEC is properly configured. Improper configurations may include configured tail length, type of NLP configuration, and whether the LEC is actually enabled or disabled. A misconfigured tail, disabled LEC, and disabled search operations are all indicators used to identify a potentially erroneous LEC configuration. If the LEC configuration uses a short tail and no search, then this data would also indicate that the search function is disabled. The LEC configuration data can be correlated together to measure LEC configuration status and, in turn, can be correlated with other LEC data indicators for a network voice quality status S122.

Voice network quality may also be determined by fusing data from non-LEC sources LEC data may be gathered and fused with non An example of voice quality data generation from different levels of hierarchy in the network include MG 84 and its connected nodes. DSP 94 is a processor within MG 84 that is performing numerous voice processing tasks in multiple voice channels 96 that can generate different types of voice quality-related data. Each voice channel 96 in DSP 94 has software modules performing voice codec and packet-related algorithms within the channel. IPP 92 can be connected to MG 84 via a high-speed digital subscriber line (DSL), cable modem, or direct network line, each of which would each create a set of voice quality transmission statistics. IPP 90 connects to Internet 76 through communication server 86 and generates voice quality data at the IP phone, AP 88, server 86 and up through transmission lines to the Internet 74.

At all levels of the network, data for bi-directional signal level measurements, network jitter, network delay, general packet statistics (such as number of packets, lost packets, types, and corrupted packets), and congestion data can be generated and reported. Mean Opinion Scores (MOS) can be determined via algorithms for voice transmissions at any transmission point in the network. Selected data or MOS scores can be compared to and analyzed against a set of thresholds and/or rules for each particular type of data.

Based on LEC data alone or in fusion with non-LEC related sets of voice quality data voice quality assessment reports can be generated S114. Data collection of voice quality assessments of any network element or group of elements can be searched in real-time to analyze for voice quality on a macro scope for an entire network, intermediate network, or for individual analysis any network level. In a voice-data network, data generation and collection on such a global scale will result in a large magnitude of data than can overwhelm and administrator and provide difficulty in deciphering the important metrics needed to monitor quality. To avoid the problem of dealing with an overwhelming mass of network data, the LEC data is analyzed through the rules and thresholds and then fused with other related or non-related data to create quality assessments of one or more reduced and simplified values. An example of fusing data is to focus on tracking voice and non-voice related data, such as packet transmission quality in combination with signal quality, echo cancellation, and voice power levels. Such a refinement of network and voice quality data extends far beyond mere monitoring of network servers and packet transmissions. Instead, the preferred embodiment provides the ability to reduce and isolate large volumes of raw data, correlate related and unrelated voice quality data together into one or more quality assessment values, and monitor the quality assessment in real time or over a period of time off-line.

Thus, the quality of the VOIP network can be monitored and instantly determined at any time using diagnostics within each level of the network that report voice quality assessments. An overall voice quality assessment score may represent any configurable number or logical organization of individual data assessments for each network element such as a module, node, gateway, IPP, server, etc. For example, all of the voice channels in a DSP may be analyzed against thresholds set for packet loss, delay, and echo cancellation performance. The same comparison could be made for all IPPs connected to a communications server.

An important aspect of the present invention is the method of data collection and analysis for voice quality determination and monitoring. In addition to merely reporting raw hardware or software parameters that trigger some type of operational alarm, targeted voice quality parameters and may be combined, or fused, together to create a characterization of the health and behavior of each network element, call path, and/or the voice network as a whole. In addition to LEC data, general network statistics are monitored for network-level metrics such as jitter, packet delay, background noise levels, bi-direction signal levels, and packet statistics. Direct data may continue to be collected from each level of the VOIP network for evaluation of trends of operational data that could result in voice quality problems in the network. LEC Data gathered from anywhere in the primary IP network and/or remote telecommunication networks may be fused together to give an indication of VOIP network quality according to configurable classifications of performance. Thus, by combining and analyzing voice quality and network data along the entire traced route of a call, a network administrator can measure voice quality related to LEC and other network parameters along various routes of the call.

LEC data can be correlated together in any configuration or cross-hierarchy from throughout the VOIP network. If data can be gathered from external carriers or networks, this external data could also be integrated with VOIP network data to provide a more comprehensive analysis of call performance. This makes it possible to view trends of call statistics throughout the network in any logical combination of correlations. Such evaluations can be performed in real-time or off-line. A user may look up and down the hierarchical levels and call routes in the entire VOIP network. Thus, different types of data in the VOIP network may be fused together to create different views of network performance, such as LEC modules, voice channels, groups of software functions, packet transfer and network congestion, time division multiplex data, echo cancellation, and so forth. Trends in voice quality performance can be monitored continually with data created at each element in a network.

Monitoring voice quality over an entire network using the methods of the preferred embodiment allows automatic collection of additional call information to be included in a management call record for post-analysis. The analyst can trace call routes to identify network call paths as well as phone numbers where collected data indicates problems in the network or where customers may comment of having poor quality or connection problems with calls.

The assembly of a selected set of LEC performance indicators can be aggregated to search for, and evaluate patterns in, VOIP network performance indicators across all hierarchical network levels. Voice quality reports include analysis of transient data flowing through the network for real-time or offline analysis. An aggregated data report for a network module, node, group of components, or an entire network division includes all the lower level voice quality indicators (e.g., jitter, MOS, lost packets, codec, LEC data, etc.) that are aggregated for each of the groups of components according to grouping schedules. For example, each of the nodes could report a voice quality score or data indicator that includes all of the voice quality indicators for the DSPs, channels, and ECUs in each of the hardware devices and packet transfer statistics for all components that comprise the node. To determine an aggregated performance of DSPs in a node, only the node data needs to be queried for performance indicators since a report of the node's voice quality indicator data includes all of the data indicators for all related modules within the node.

Direct raw data and voice quality indicator data sets may selectively be gathered and stored for offline analysis. The isolated components in the network may then be investigated to search for related data sets reporting error flags and the raw data for the individual network components creating the error flag investigated throughout the levels of the network. For example, if a specific phone number is consistently experiencing QoS problems with calls, the network behavior of the entire call path can be traced and evaluated. A problem with a call may not be caused by a hardware failure but could be a performance problem that is flagged by the reporting of voice data in a specific part of the network.

The present invention allows a network administrator to isolate the problem down to an individual module within a channel and take corrective action in the problematic component prior to complete failure of the component or failure of the network. Through data collection and correlation, periodic pro-active offline audits of an targets aspects of network performance can be performed in order to increase quality of the voice network without causing interruptions in service.

Figure 5:
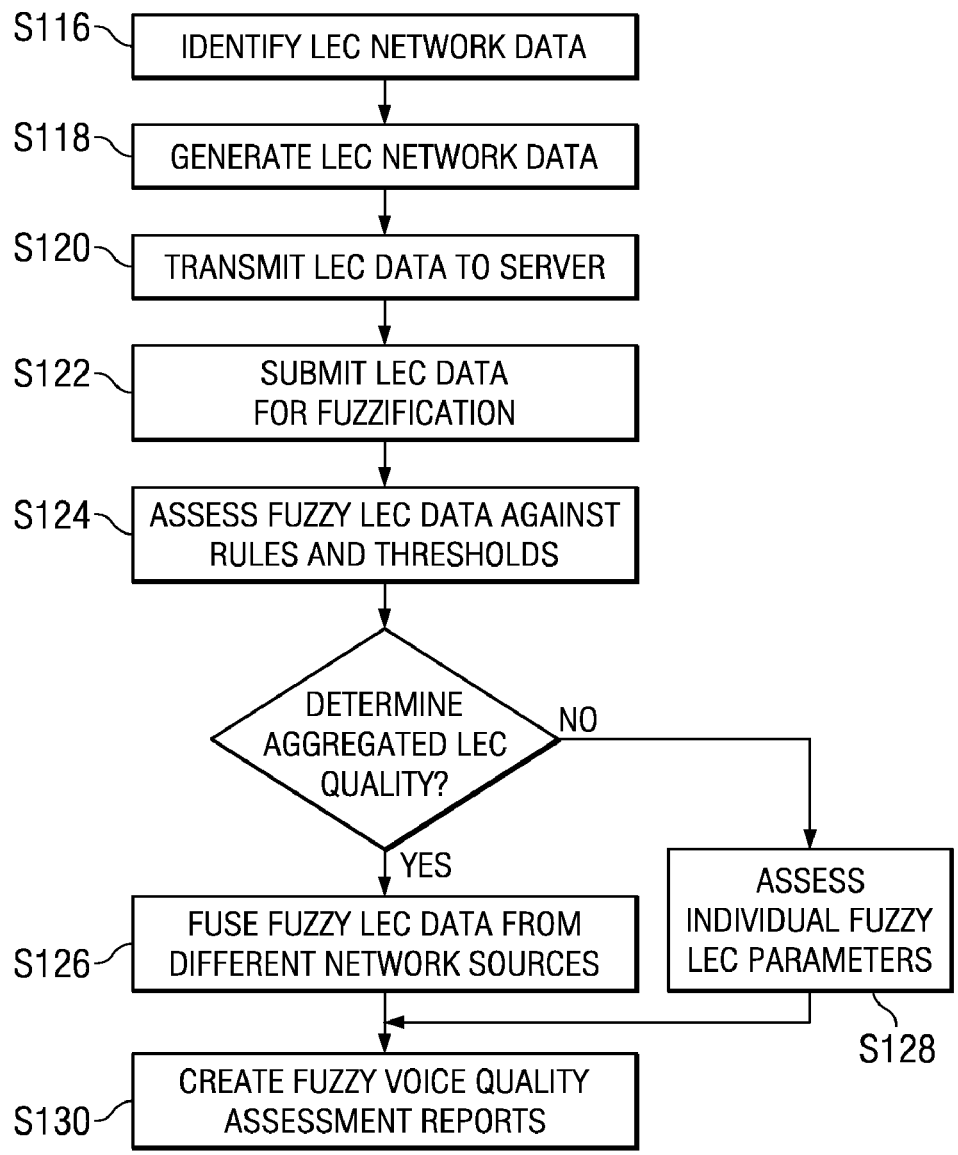
FIG. 5 contains a flowchart of the method of the alternative embodiment for an intelligent voice network monitoring system.

In an alternative exemplary embodiment, LEC data on each hierarchical level of the network is reported using fuzzy data sets. Referring to the flowchart in FIG. 5, the VOIP network administrator defines the identities of the LEC fuzzy sets for each component of each network level S116. The LEC voice and non-voice network data may be gathered S118 and reported to central monitoring server S122. Data may be generated for individual network elements or aggregated together in any combination possible. For example, modules 94, 96 report fuzzy LEC data to the MG 84 and modules 90, 88 report fuzzy LEC data sets to server 98. To report fuzzy LEC data sets, raw LEC data is gathered from network elements and transmission lines and submitted for fuzzification S122. All fuzzy LEC data sets could be analyzed independently or aggregated together to provide a single fuzzy LEC quality score for a group of network elements, a leg of a network, or the entire VOIP network. Thus, fuzzy LEC data determinations are made of the health of hardware, software, and communication links for each hierarchical level, down to modules in each of the nodes.

As stated above, to avoid the problem of dealing with an overwhelming mass of LEC network data, the fuzzy LEC data is also analyzed through the rules and thresholds and then fused with other LEC related or non-related data to create quality assessments of one or more reduced and simplified values. An example of fusing data is to focus on tracking LEC and non-LEC related data, such as packet transmission quality in combination with signal quality, echo cancellation, and voice power levels. Such a refinement of network and voice quality data extends far beyond mere monitoring of network servers and packet transmissions. Instead, the preferred embodiment provides the ability to reduce and isolate large volumes of raw data, correlate related and unrelated voice quality data together into one or more quality assessment values, and monitor the quality assessment in real time or over a period of time off-line.

The fuzzy LEC data sets reflect network component operation and voice quality status and are based on fuzzy logic. Fuzzy logic has the advantages of the ability to model expert systems comprising inputs with uncertainties that cannot be modeled with pure logic. Fuzzy inference is the process of formulating the mapping from a given input to an output using fuzzy logic. In other words, fuzzy logic uses a system with inputs that can be true or false to a certain degree, according to membership in a set. Fuzzy systems are based on rules that may be obtained using heuristics (e.g., from a human expert), or from inferential rules based on a behavior of the system. The flexibility in which additional functionalities may be added for a process control are also advantages of the fuzzy inference system. The fuzzy inference system of the present invention provides an operational reporting technique that results in a superior way over existing methods or systems.

Using fuzzy reporting, LEC and non-LEC quality data may be tracked over time while monitoring for trends. Fuzzy logic may be considered an extension of conventional Boolean logic in that logical values are not restricted to zero (FALSE) and one (TRUE), but rather can take on any value between zero and one inclusive. This provides greater flexibility and precision in the description process. For example, if membership in the set of "tall people" was represented with a Boolean variable, there will likely be controversy over where to set a "tall" threshold (e.g., the cutoff height for defining what is a "tall" person). On the other hand, with fuzzy logic, membership is represented by a continuum of values. One individual may receive 0.8 membership while another individual may receive 0.1 membership in the "tall" set. Applied to voice quality monitoring in a VOIP network, this method be used to track data from one or more network sources over time while the administrator is periodically observing the data for trends in the data that may trend towards optimal performance or trend towards a failure of performance. However, the hardware or software being monitored does not necessarily report a "good" or "bad" flag in operation or performance since the fuzzy data is not restricted to such boolean-type monitoring results.

A fuzzy inference system (FIS) is a system that uses fuzzy logic to map one or more inputs to one or more outputs. The FIS employed in the exemplary embodiment is based on Mamdani's fuzzy inference method. However, it is understood that one skilled in the art will recognize that the present invention is not limited merely to Mamdani or any particular fuzzy logic method. Mamdani's method uses fuzzy inference in which both the inputs and outputs are treated as fuzzy variables.

A fuzzy inference system may generally be described functionally in the following five steps:
1. Fuzzification of inputs through membership functions;
2. Application of fuzzy operations as defined by the rules;
3. Implication to create fuzzy outputs for each rule;
4. Aggregation of fuzzy rule outputs; and
5. Defuzzification of aggregated fuzzy output.

Step five, defuzzification of aggregated fuzzy output, is implemented in the exemplary embodiment because direct fuzzy outputs are used to report operations of the VOP network and network components. It is understood that one skilled in the art will recognize that defuzzification of aggregated fuzzy output may also be implemented in the embodiments without departing from the scope of the present invention.

Fuzzified LEC data can be analyzed against a set of rules and thresholds S124 for each parameter measured individual performance rating of "good," "bad," or "needs service," or any indicator flag desired by the network manager in addition to fuzzy reporting of the performance of an entire VOIP network in a single fuzzy indicator. Data may be monitored along a sliding scale that indicates whether the software or hardware being monitored is trending towards optimum performance or failure. However, the LEC data may also be assigned flags to indicate whether the behavior is over, under or between thresholds given by an administrator. In an exemplary embodiment, such indicators could provide flags, such as "good," "bad," and "needs attention" or "red," "yellow," and "green" could be programmed to reflect data assessments. Thus, an important concept of the present invention is that one or more fuzzy values can be used to reflect a single LEC quality data assessment or many fused assessments for a VOIP network.

According to the alternative embodiment, the LEC performance of each associated module in each node 102, 98 is evaluated using fuzzy reports of operational data S128. Fuzzy LEC data sets can indicate the channels in the DSP that are performing properly and which are under-performing and which are failing to perform. Using an aggregation reporting scheme, each fuzzy LEC data set can be combined with non-LEC fuzzy sets of data to create a combined analysis of VOIP network performance S126. A final aggregated fuzzy report is then produced that reflects the operations and voice quality of the incorporated elements.

The fuzzy performance indicators of LEC on the VOIP network can be used to search and evaluate patterns of network performance across all levels of the network. A snapshot of all levels of the network may be evaluated for VOIP voice quality and status over time, evaluated in an offline analysis. The fuzzy LEC data reports include analysis of transient voice and system data flowing through the network and the behavior of each network element S130.

The LEC performance of the VOIP network can be monitored and instantly determined at any time using diagnostics within each level of the network that report fuzzy LEC data as flags. In an exemplary embodiment, such fuzzy indicators could provide a "red," "yellow," or "green" flagged alarm depending upon the performance of the network component. Such flags can then be correlated with other flags from the same or different hierarchical levels to indicate behavior of all echo cancellers in a LAN at a certain level of network use, or the performance throughout the entire VOIP. The fuzzy LEC data report for a VOIP network may be configured to include a single node and its modules, a group of nodes, servers, and gateways, or all network elements including data transmission statistics throughout the network.

Fuzzy LEC data can be searched to isolate errors. Fuzzy reported data can be correlated, or fused, together with LEC and non-LEC data from throughout the network to determine an overall behavior of the VOIP network instead of scoring performance of individual network components. This makes it possible to view trends of operational performance throughout the network in any combination of views. Any set of direct or fuzzy LEC data groups or types of non-LEC data may also be collected for offline analysis. A user may look up and down legs of in the entire VOIP network to analyze where the errors indicated by the fuzzy LEC data set reporting are occurring. Thus, different types of data in the VOIP network may be fused together such as modules, voice channels, groups of software functions, packet transfer and network congestion, time division multiplex data, echo cancellation, and so forth to create different assessments of the factors that affect voice quality within the network.

Fuzzy and direct LEC data is collected from each level of the VOIP network for evaluation of trends of operational and voice quality problems in the network. For example, all errors in a VOIP may be reported in and from other devices connected to a single voice gateway device. The fuzzy LEC data sets from the voice gateway may then be further analyzed to search for errors within a specific processor, voice channel, or module.

Direct raw and fuzzy LEC data sets may selectively be collected and stored for offline analysis. The isolated components in the network may then be investigated to search for related fuzzy data sets reporting error flags and the raw data for the individual network components creating the error flag investigated throughout the levels of the network. This allows a network administrator to isolate the problem down to an individual module within a channel and take corrective action in the problematic component prior to complete failure of the component or failure of the network. A problem with a call may not be caused by a hardware failure but could be a performance problem that is flagged by the fuzzy reporting of LEC data in a specific part of the network. Through data collection and correlation, periodic pro-active offline audits of an entire network performance, from central servers and media gateways down the hierarchical levels to software modules in individual voice channels, can be performed in order to increase quality of the network without causing interruptions in service. By fusing fuzzy LEC data sets together, trends in data and network performance can be researched and analyzed. If a specific phone number is consistently experiencing echo problems with calls, the network behavior can be traced and evaluated.

To accomplish fuzzy LEC data reporting, each monitored network element can either continuously calculate and transmit the fuzzy data or periodically report the data to monitoring server 98. Time of periodicity for polling a lower level node for data or transmitting the data to a higher level can differ according to configuration by the network manager. If raw data is not requested or needed from a network component, then only the fuzzy data report needs to be transmitted.

The preferred use of fuzzy reporting of LEC data affecting voice quality, instead of merely reporting raw hardware or data transfer statistics, characterizes the behavior of a VOIP network either in correlated groups of network elements or the network as a whole. Fuzzy LEC data from different hierarchical levels, from remote hardware components, or from any combination of nodes and modules can be correlated together to provide an indication of VOIP network performance.

The present invention has an advantage that is a simple way to proactively identify and flag potential problems in a voice network to allow rapid response to major voice quality issues that impact customer's voice services, and allow service providers to monitor network voice performance in order to proactively improve and optimize voice quality in the network. The present invention provides further advantages of real-time indication to a network administrator of potential network issues that can proactively be addressed prior to customer problem reports. Thus, proactive maintenance of VoIP networks is provided on a comprehensive scale over all hierarchical levels of the networks.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed:

1. A method for intelligent real-time network monitoring in a Voice-over-IP (VOIP) network, comprising:
   generating line echo cancellation (LEG) data from a line echo canceller on said VOIP network;
   aggregating said analyzed echo cancellation data from a plurality of data-generating sources within one or more said network elements from throughout the entire VOIP network into correlated groups of network elements;
   analyzing said line echo cancellation data using line echo cancellation rules for said VOIP network;
   correlating said line echo cancellation data with voice quality data from a plurality of network elements from throughout the entire VOIP network; and
   providing a voice quality assessment of said VOIP network using said aggregated voice quality data from the plurality of data-generating sources within one or more said network elements from throughout the entire VOIP network.

2. The method of claim 1, wherein said correlating further comprises:
   tracing routes of a voice call in said VOIP network; and
   correlating said echo cancellation data collected that affect said voice call along said traced routes.

3. The method of claim 1, wherein said generating comprises gathering and comparing said analyzed LEC data to determine quality of a call setup and voice data transmissions along a route in said VOIP network.

4. A method of real-time monitoring a voice over packet network (VOIP), comprising:
   determining, with a fuzzy inference system, line echo cancellation performance of a plurality of network elements from throughout the entire VOIP network;
   generating fuzzy line echo cancellation (LEC) data assessments of said VOIP network elements from throughout an entire VOIP network, wherein said voice quality data may be generated for individual network elements or aggregated together into correlated groups of network elements;

analyzing said fuzzy assessments using a set of LEC rules for said VOIP network; and analyzing said fuzzy assessments to determine an aspect of said LEC performance of said VOIP network.

5. The method of claim 4, wherein said analyzing comprises defining a plurality of rules for scaling an output of said fuzzy inference system; and aggregating a plurality of said scaled outputs into a single fuzzy score, wherein said score determines a quality of LEC for an element of said VOIP network.

6. The method of claim 5, wherein said aggregating comprises aggregating fuzzy data sets from a lower hierarchical level in said network into a higher hierarchical level in said VOIP network.

7. The method of claim 4, wherein said analyzing comprises monitoring for LEC of a voice over Internet Protocol call by analyzing fuzzy LEC data sets from components in said network that are associated with said call.

8. The method of claim 4, wherein said analyzing comprises combining fuzzy LEC data sets from different types of said network components to evaluate trends in said fuzzy LEC data sets.

9. The method of claim 4, wherein said analyzing further comprises determining a quality of a voice call on said network by tracing a route of said call through said network and analyzing said fuzzy LEC data sets associated with elements of said route.

* * * * *